United States Patent
Hung et al.

(10) Patent No.: US 12,191,704 B2
(45) Date of Patent: Jan. 7, 2025

(54) VEHICLE POWER MANAGEMENT SYSTEM AND OPERATION METHOD THEREOF

(71) Applicant: Getac Technology Corporation, New Taipei (TW)

(72) Inventors: Yung-Le Hung, Taipei (TW); Cheng-Liang Huang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 69 days.

(21) Appl. No.: 18/180,808

(22) Filed: Mar. 8, 2023

(65) Prior Publication Data

US 2024/0146097 A1 May 2, 2024

Related U.S. Application Data

(60) Provisional application No. 63/420,467, filed on Oct. 28, 2022.

(51) Int. Cl.
*H02J 7/34* (2006.01)
*B60L 3/00* (2019.01)
(Continued)

(52) U.S. Cl.
CPC ............ *H02J 7/342* (2020.01); *B60L 3/0046* (2013.01); *B60R 16/03* (2013.01); *B60R 16/033* (2013.01);
(Continued)

(58) Field of Classification Search
CPC .... H02J 7/34; H02J 7/342; H02J 9/061; H02J 9/068; H02J 7/0047; H02J 7/00712;
(Continued)

(56) References Cited

U.S. PATENT DOCUMENTS

| 5,899,082 A * | 5/1999 | Stein ................. B60H 1/00828 62/282 |
| 9,347,414 B2 | 5/2016 | Proebstle |

(Continued)

FOREIGN PATENT DOCUMENTS

| CN | 105703023 A | 6/2016 |
| CN | 113852168 A | 12/2021 |

(Continued)

OTHER PUBLICATIONS

Search Report issued on Aug. 29, 2023 for EP application No. 23160161.8.

*Primary Examiner* — Rexford N Barnie
*Assistant Examiner* — Rasem Mourad
(74) *Attorney, Agent, or Firm* — Li & Cai Intellectual Property Office

(57) ABSTRACT

A vehicle power management system and an operating method thereof are provided. The vehicle power management system is adapted for a vehicle load device and a vehicle power supply, and includes a control circuit, a charge/discharge circuit and a backup battery. The control circuit is electrically connected to the vehicle power supply and the vehicle load device, and monitors an output voltage of the vehicle power supply and determines according to the output voltage whether a vehicle engine is started. The charge/discharge circuit is electrically connected to the control circuit and the backup battery. When the vehicle engine is started, the charge/discharge circuit supplies power of the vehicle power supply to the backup battery and the vehicle load device. When the vehicle engine is not started, the backup battery discharges the charge/discharge circuit and the charge/discharge circuit supplies power of the backup battery to the vehicle load device.

9 Claims, 12 Drawing Sheets

(51) Int. Cl.
  *B60R 16/03* (2006.01)
  *B60R 16/033* (2006.01)
  *H02J 7/00* (2006.01)
  *H02J 9/06* (2006.01)

(52) U.S. Cl.
  CPC ........ *H02J 7/0047* (2013.01); *H02J 7/00712* (2020.01); *H02J 9/061* (2013.01); *H02J 7/0024* (2013.01); *H02J 7/007* (2013.01)

(58) Field of Classification Search
  CPC ....... B60R 16/03; B60R 16/033; B60L 53/20; Y02T 10/62
  See application file for complete search history.

(56) References Cited

U.S. PATENT DOCUMENTS

| | | | |
|---|---|---|---|
| 10,703,210 | B2 | 7/2020 | Kees et al. |
| 10,910,875 | B2 | 2/2021 | Teng |
| 11,059,371 | B2 | 7/2021 | Kageyama et al. |
| 2018/0191185 | A1* | 7/2018 | Al Rasheed ............ H02J 7/342 |
| 2018/0297478 | A1 | 10/2018 | Wang et al. |
| 2020/0259363 | A1 | 8/2020 | Fukae |
| 2021/0237670 | A1 | 8/2021 | Takahara |
| 2021/0300209 | A1 | 9/2021 | Kim |
| 2022/0029452 | A1* | 1/2022 | Kambara ............. H02J 7/0047 |
| 2022/0032860 | A1 | 2/2022 | Pronina et al. |
| 2022/0089111 | A1 | 3/2022 | Morita |
| 2022/0103007 | A1 | 3/2022 | Shindo |
| 2022/0200311 | A1 | 6/2022 | Oonishi |
| 2022/0258647 | A1 | 8/2022 | Joao |
| 2023/0415609 | A1* | 12/2023 | Lu ........................ B60L 58/19 |

FOREIGN PATENT DOCUMENTS

| | | |
|---|---|---|
| EP | 1025632 B1 | 4/2003 |
| EP | 2686198 B1 | 3/2019 |
| JP | 2001352687 A | 12/2001 |
| JP | 2008290513 A | 12/2008 |
| JP | 2018171979 A | 11/2018 |
| TW | 202118186 A | 5/2021 |
| TW | 202142426 A | 11/2021 |
| TW | M624892 U | 3/2022 |

* cited by examiner

VEHICLE POWER MANAGEMENT SYSTEM AND OPERATION METHOD THEREOF

CROSS-REFERENCE TO RELATED PATENT APPLICATION

This application claims the benefit of priority to the U.S. Provisional Patent Application Ser. No. 63/420,467 filed on Oct. 28, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND OF THE INVENTION

Field of the Invention

The present invention relates to a power management system and an operating method thereof, and more particularly, to a vehicle power management system and an operating method thereof.

Description of the Prior Art

On the basis of regulatory requirements, when a vehicle is parked on the side of a road, it is necessary for the driver to turn off the vehicle engine, so as to prevent the vehicle from continuing emitting exhaust and causing air pollution. However, when the engine is turned off, the vehicle power supply also stops powering an in-vehicle load device (for example, a digital video recorder and a vehicle interior light) mounted in the vehicle, such that the driver becomes incapable of using the in-vehicle load device.

In addition to the above, power needed for operating in-vehicle load devices in the vehicle also needs to be supplied by the vehicle power supply. However, apart from the in-vehicle load devices that need the power of the vehicle power supply, ignition of the vehicle engine also needs power of the vehicle power supply. As the number of in-vehicle load devices mounted in the vehicle increases, the power stored in the vehicle power supply may be quickly depleted, resulting in insufficient power of the vehicle power supply for starting the engine.

SUMMARY OF THE INVENTION

A technical problem to be solved by the present invention is to provide a vehicle power management system and an operating method thereof for the drawbacks of the prior art.

To solve the above technical problems, a vehicle power management system is provided according to one technical solution of the present invention. The vehicle power management system is adapted for a vehicle load device and a vehicle power supply, and includes a control circuit, a charge/discharge circuit and a backup battery. The control circuit is electrically connected to the vehicle power supply and the vehicle load device, and monitors an output voltage of the vehicle power supply and determines according to the output voltage whether a vehicle engine is started. The charge/discharge circuit is electrically connected to the control circuit, the backup battery and the vehicle load device. When the vehicle engine is started, the charge/discharge circuit supplies power of the vehicle power supply to the backup battery and the vehicle load device. When the vehicle engine is not started, the backup battery discharges the charge/discharge circuit and the charge/discharge circuit supplies power of the backup battery to the vehicle load device.

To solve the above technical problems, a vehicle power management system is provided according to another technical solution of the present invention. The vehicle power management system is adapted for a vehicle load device, a vehicle power supply and a backup battery. The vehicle power management system includes a control circuit and a charge/discharge circuit. The control circuit is electrically connected to the vehicle power supply and the vehicle load device, and monitors an output voltage of the vehicle power supply and determines according to the output voltage whether a vehicle engine is started. The charge/discharge circuit is electrically connected to the control circuit, the backup battery and the vehicle load device. When the vehicle engine is started, the charge/discharge circuit supplies power of the vehicle power supply to the backup battery and the vehicle load device. When the vehicle engine is not started, the backup battery discharges the charge/discharge circuit and the charge/discharge circuit supplies power of the backup battery to the vehicle load device.

To solve the above technical problems, an operating method of a vehicle power management system is provided according to another technical solution of the present invention. The operating method includes: monitoring an output voltage of a vehicle power supply by a control circuit; determining according to the output voltage by the control circuit whether a vehicle engine is started; when the vehicle engine is started, supplying power of a vehicle power supply to a backup battery and a vehicle load device by a charge/discharge circuit; when the vehicle engine is not started, discharging the charge/discharge circuit by the backup battery; and supplying power of the backup battery to the vehicle load device by the charge/discharge circuit.

One beneficial effect of the present invention is that, the vehicle power management system and the operating method thereof provided by the present invention allow a driver to continue using the vehicle load device mounted in a vehicle when the vehicle engine is turned off. In addition, when the vehicle engine is turned off, the power needed for operating the vehicle load device is completely supplied by the backup battery and the vehicle load device does not at all use power of the vehicle power supply, thus preventing depletion of the power of the vehicle power supply and hence an engine re-start failure caused thereby.

To further understand the features and technical contents of the present invention, the present invention is described in detail with the accompanying drawings below. It should be noted that the drawings provided are for reference and illustration purposes, and are not to be construed as limitations to the present invention.

DETAILED DESCRIPTION OF THE EMBODIMENTS

The implementation related to "a vehicle power management system and an operating method thereof" of the present invention are described by way of specific embodiments, and a person skilled in the art would be able to understand the advantages and effects of the present invention on the basis of the disclosure of the present application. The invention may be implemented or applied by other specific embodiments, and changes and modifications may also be made on the basis of different perspectives and applications to various details in the description without departing from the concept and spirit of the present invention. Moreover, it should be noted that the drawings of the present invention are depicted in brief for illustration purposes, and are not drawn to actual scales. Technical contents associated with the present invention are described in detail below, and it should be noted that the disclosure is not to be construed as limitations to the scope of protection of the present invention.

It is understandable that, although terms such as "first", "second" and "third" are used in the literature to describe various elements or signals, these elements or signals are not to be limited by these terms. These terms are used to differentiate one element from another element, or one signal from another signal. In addition, the term "or" used in the literature may include one or more combinations of related enumerated items depending on actual conditions.

Figure 1:
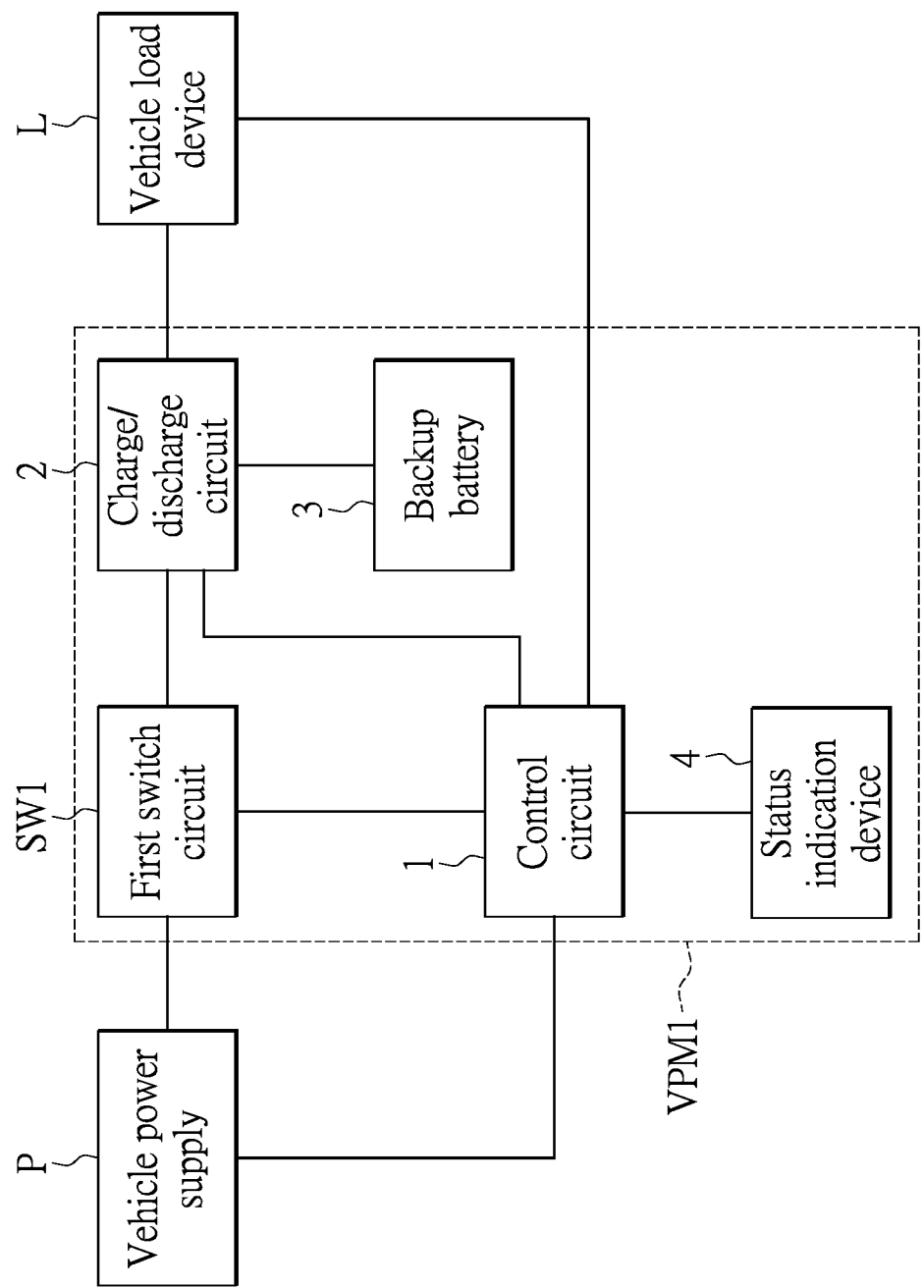
FIG. 1 is a function block diagram of a vehicle power management system according to a first embodiment of the present invention.

FIG. 1 shows a function block diagram of a vehicle power management system according to a first embodiment of the present invention. As shown in FIG. 1, a vehicle power management system VPM1 is adapted for a vehicle load device L and a vehicle power supply P, and includes a control circuit 1, a first switch circuit SW1, a charge/discharge circuit 2, a backup battery 3 and a status indication device 4. The control circuit 1 is electrically connected to the vehicle power supply P, the vehicle load device L, the first switch circuit SW1, the charge/discharge circuit 2 and the status indication device 4. The charge/discharge circuit 2 is further electrically connected to the backup battery 3, the vehicle power supply L and the first switch circuit SW1. The status indication device 4 is, for example, multiple light emitting diodes or a display screen, and is used to display a charging status and a discharging status of the charge/discharge circuit 2.

The control circuit 1 is, for example, any one of an application specific integrated circuit (ASIC), a programmable field gate array (FPGA), a microcontroller unit (MCU) and a system-on-chip (SoC) or a combination thereof, and may coordinate with other related circuit elements and firmware so as to implement the functions below.

The control circuit 1 is set with an allowed input voltage range and a voltage threshold, wherein the voltage threshold is within the allowed input voltage range. The control circuit 1 is capable of continually monitoring or monitoring according to a predetermined cycle an output voltage of the vehicle power supply P. When the control circuit 1 learns that the monitored output voltage of the vehicle power supply P is within the allowed input voltage range and is greater than or equal to the voltage threshold, the control circuit 1 determines according to the output voltage of the vehicle power supply P that a vehicle engine is started. At this point, the control circuit causes the first switch circuit SW1 to be in an on state, so that the charge/discharge circuit 2 can then receive power from the vehicle power supply P.

For example, the allowed input voltage range is predetermined as 6 V to 20 V, and the voltage threshold is predetermined as 10 V. When the control circuit 1 learns that the monitored output voltage of the vehicle power supply P is greater than or equal to 10 V and smaller than or equal to 20 V, the control circuit 1 causes the first switch circuit SW1 to be in an on state.

The control circuit 1 is further set with rated values of a charging voltage and a charging current. When the control circuit 1 determines that the vehicle engine is started, the control circuit 1 sends a control signal to the charge/discharge circuit 2. When the charge/discharge circuit 2 receives the control signal, the charge/discharge circuit 2 supplies power of the vehicle power supply P individually to the backup battery 3 and the vehicle load device L according to the rated values of the charging voltage and the charging current set by the control circuit 1. The status indication device 4 is, for example, multiple light emitting diodes. When the charge/discharge circuit 2 supplies power individually to the backup battery 3 and the vehicle load device L, the light emitting diodes present light in a first color.

For example, assuming that the rated values of the charging voltage and the charging current are predetermined as 14.6 V and 6 A, respectively, it means that a maximum charging voltage and a maximum charging current provided by the charge/discharge circuit 2 for the backup battery 3 and the vehicle load device L can reach 14.6 V and 6 A, respectively.

Conversely, when the control circuit 1 learns that the monitored output voltage of the vehicle power supply P is not within the allowed input voltage range or is smaller than the voltage threshold, the control circuit 1 determines according to the output voltage of the vehicle power supply P that the vehicle engine is not started. At this point, the control circuit causes the first switch circuit SW1 to be in an off state, and sends a control signal to the charge/discharge circuit. Next, the charge/discharge circuit 2 cannot receive power from the vehicle power supply P and the backup battery 3 starts to discharge the charge/discharge circuit 2. Then, the charge/discharge circuit 2 supplies power of the backup battery 3 to the vehicle load device L. The status indication device 4 is, for example, multiple light emitting diodes. When power of the backup battery 3 is supplied to the vehicle load device L, the light emitting diodes present light in a second color.

Moreover, when the control circuit 1 determines that the vehicle engine is not started, the control circuit 1 sends first engine status information to the vehicle load device L, wherein the content of the first engine information indicates that the vehicle engine is started, for the vehicle load device L to learn a current engine status. If the vehicle engine is still not started after a predetermined period of time, the control circuit 1 again sends second engine status information to the vehicle load device L, wherein the content of the second engine information indicates that the vehicle engine is not started, for the vehicle load device L to learn the current engine status.

For example, the allowed input voltage range is predetermined as 6 V to 20 V, and the voltage threshold is predetermined as 10 V. When the control circuit 1 learns that the monitored output voltage of the vehicle power supply P is smaller than 6V or greater than 20 V, the control circuit 1 causes the first switch circuit SW1 to be in an off state. When the control circuit 1 learns that the monitored output voltage of the vehicle power supply P is greater than or equal to 6 V and smaller than 10 V, the control circuit 1 causes the first switch circuit SW1 to be in an off state.

Figure 2:
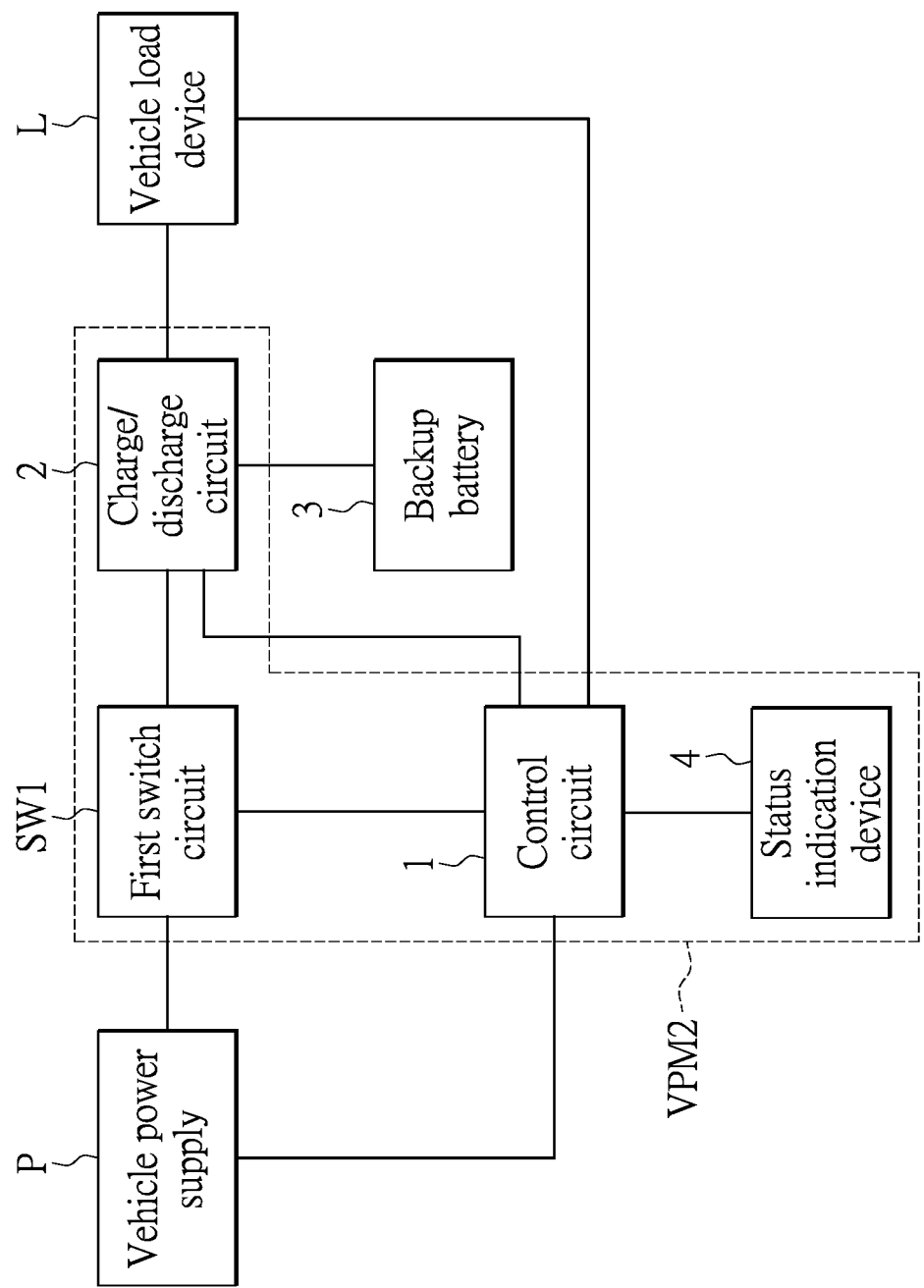
FIG. 2 is a function block diagram of a vehicle power management system according to a second embodiment of the present invention.

FIG. 2 shows a function block diagram of a vehicle power management system according to a second embodiment of the present invention. In the description below, only differences of a vehicle power management system VPM2 of the second embodiment over the vehicle power management system VPM1 of the first embodiment are given. As shown in FIG. 2, the vehicle power management system VPM2 is adapted for a vehicle load device L, a vehicle power supply P and a backup battery 3, and includes a control circuit 1, a first switch circuit SW1 and a charge/discharge circuit 2. Hence, it is known that the backup battery 3 is omitted from the vehicle power management system VPM2 compared to the vehicle power management system VPM1. Details of the collaborative operations and data transmission among the control circuit 1, the first switch circuit SW1, the charge/discharge circuit 2, the vehicle load device L, the vehicle power supply P, the backup battery 3 and the status indication device 4 are as those given in the description associated with the vehicle power management system VPM1 of the first embodiment above.

Figure 3:
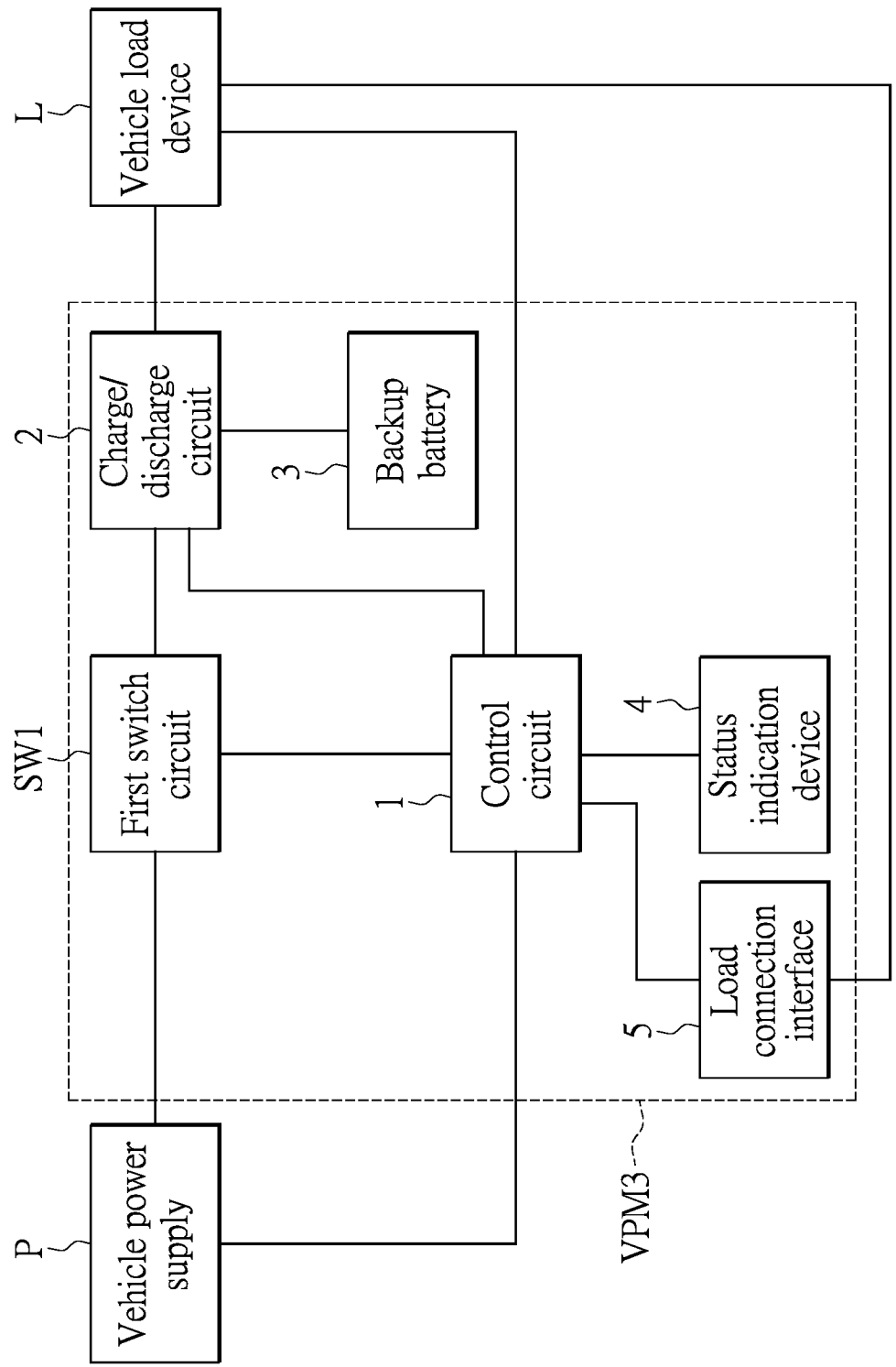
FIG. 3 is a function block diagram of a vehicle power management system according to a third embodiment of the present invention.

FIG. 3 shows a function block diagram of a vehicle power management system according to a third embodiment of the present invention. In the description below, only differences of a vehicle power management system VPM3 of the third embodiment over the vehicle power management system VPM1 of the first embodiment are given. As shown in FIG. 3, the vehicle power management system VPM3 further includes a load connection interface 5, which is electrically connected to the control circuit 1 and the vehicle load device L. The load connection interface 5 is, for example but not limited to, a USB connection interface. The control circuit 1 further monitors a power loss of the vehicle load device L. When the first switch circuit SW1 is in an on state and the control circuit 1 further learns that the monitored power loss of the vehicle load device L is greater than or equal to a power threshold, the control circuit 1 causes the first switch circuit SW1 to be in an off state and sends a control signal to the charge/discharge circuit 2. Then, the charge/discharge circuit 2 supplies power of the backup battery 3 to the vehicle load device L. Conversely, when the first switch circuit SW1 is in an on state and the control circuit 1 further learns that the monitored power loss of the vehicle load device L is smaller than the power threshold, the control circuit 1 causes the first switch circuit SW1 to be in an on state and sends a control signal to the charge/discharge circuit 2. Then, the charge/discharge circuit 2 supplies power of the vehicle power supply P to the backup battery 3 and the vehicle load device L.

Figure 4:
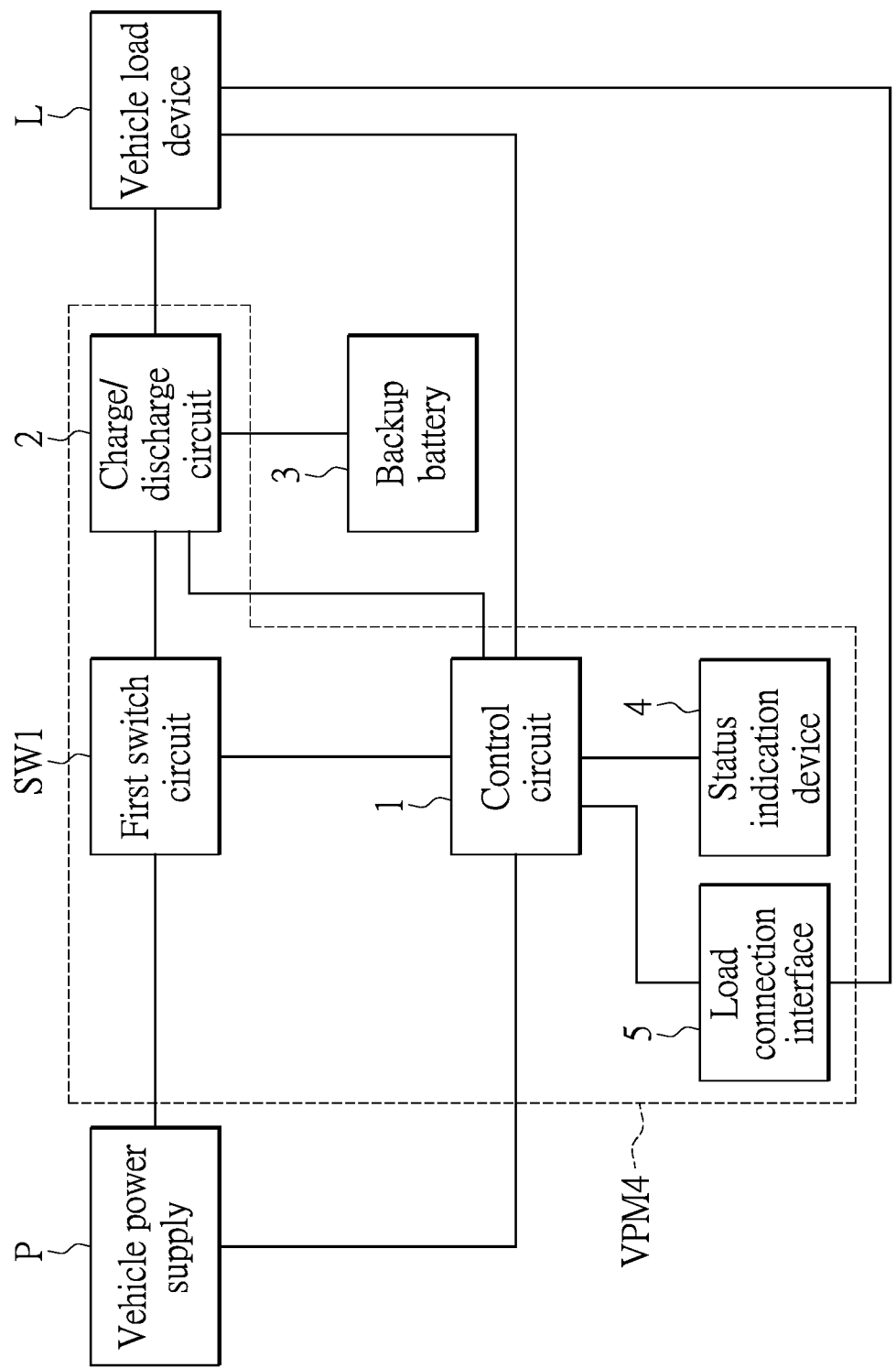
FIG. 4 is a function block diagram of a vehicle power management system according to a fourth embodiment of the present invention.

FIG. 4 shows a function block diagram of a vehicle power management system according to a fourth embodiment of the present invention. In the description below, only differences of a vehicle power management system VPM4 of the fourth embodiment over the vehicle power management system VPM3 of the third embodiment are given. As shown in FIG. 4, the vehicle power management system VPM4 is adapted for a vehicle load device L, a vehicle power supply P and a backup battery 3, and includes a control circuit 1, a first switch circuit SW1, a charge/discharge circuit 2 and a load connection interface 5. Hence, it is seen that the backup battery 3 is omitted from the vehicle power management system VPM4 compared to the vehicle power management system VPM3. Details of the collaborative operations and data transmission among the control circuit 1, the charge/discharge circuit 2, the vehicle power supply P, the vehicle load device L and the backup battery 3 are as those given in the description associated with the vehicle power management system VPM3 of the third embodiment above.

Figure 5:
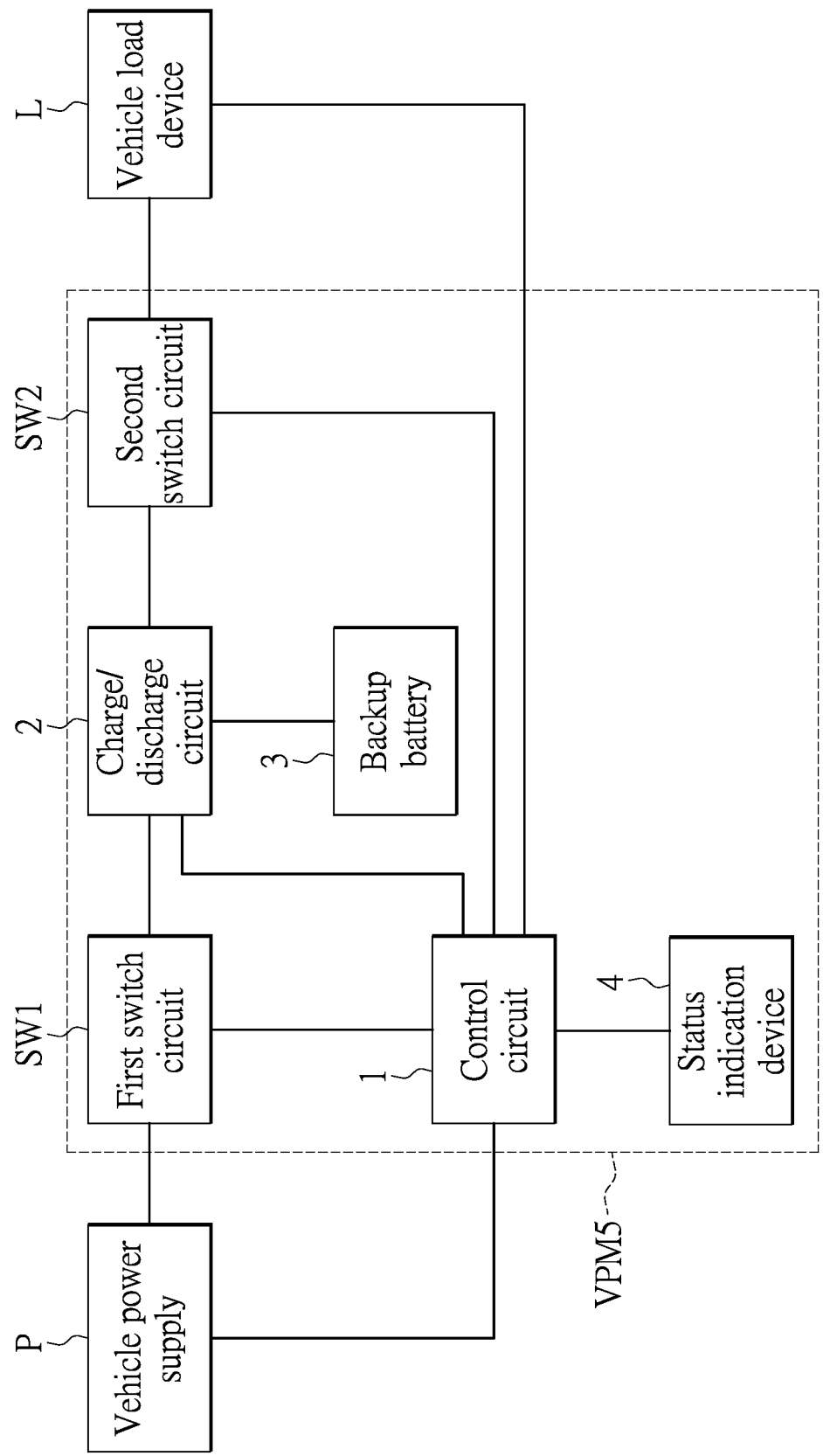
FIG. 5 is a function block diagram of a vehicle power management system according to a fifth embodiment of the present invention.

FIG. 5 shows a function block diagram of a vehicle power management system according to a fifth embodiment of the present invention. In the description below, only differences of a vehicle power management system VPM5 of the fifth embodiment over the vehicle power management system VPM1 of the first embodiment are given. As shown in FIG. 5, the vehicle power management system VPM5 further includes a second switch circuit SW2, which is electrically connected to the control circuit 1, the charge/discharge circuit 2 and the vehicle load device L. The control circuit 1 is further set with an allowed output voltage range. When an output voltage of the charge/discharge circuit 2 is within the allowed output voltage range, the control circuit 1 causes the second switch circuit SW2 to be in an on state so that the charge/discharge circuit 2 supplies the power of the vehicle power supply P or the power of the backup battery 3 to the vehicle load device L. Conversely, when the output voltage of the charge/discharge circuit 2 is not within the allowed output voltage range, the control circuit 1 causes the second switch circuit SW2 to be in an off state. At this point, the vehicle load device L cannot receive the power from the vehicle power supply P or the power from the backup battery 3.

For example, the allowed output voltage range is predetermined as 10 V to 14.6 V. When the control circuit 1 learns that the monitored output voltage of the charge/discharge circuit 2 is greater than or equal to 10 V and smaller than or equal to 14.6 V, the control circuit 1 causes the second switch circuit SW2 to be in an on state so that the vehicle load device L can receive power. When the control circuit 1 learns that the monitored output voltage of the charge/discharge circuit 2 is smaller than 10 V or greater than 14.6 V, the control circuit 1 causes the second switch circuit SW2 to be in an off state so that the vehicle load device L cannot receive power.

Figure 6:
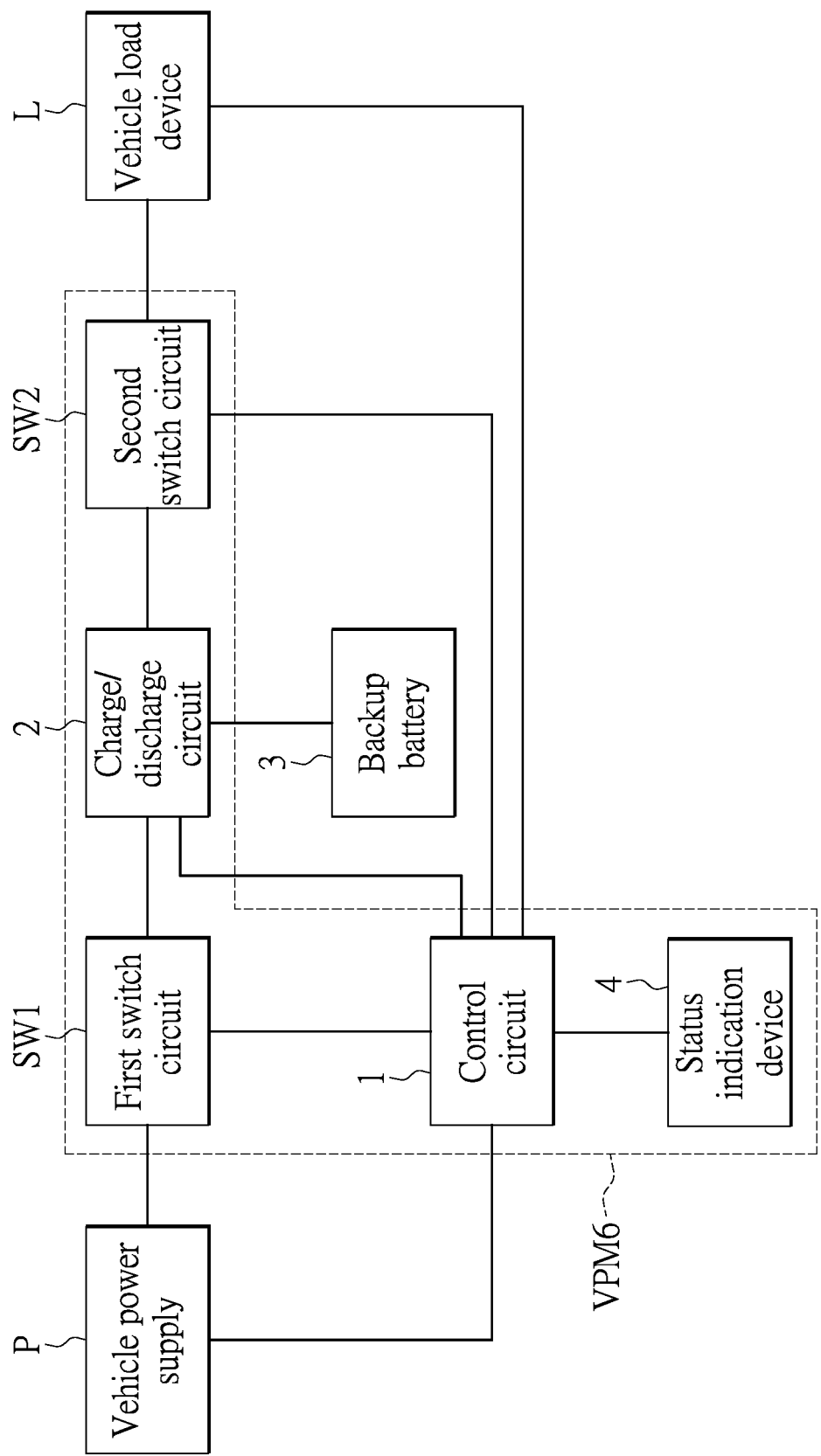
FIG. 6 is a function block diagram of a vehicle power management system according to a sixth embodiment of the present invention.

FIG. 6 shows a function block diagram of a vehicle power management system according to a sixth embodiment of the present invention. In the description below, only differences of a vehicle power management system VPM6 of the sixth embodiment over the vehicle power management system VPM5 of the fifth embodiment are given. As shown in FIG. 6, the vehicle power management system VPM6 is adapted for a vehicle load device L, a vehicle power supply P and a backup battery 3, and includes a control circuit 1, a first switch circuit SW1 and a charge/discharge circuit 2. Hence, it is seen that the backup battery 3 is omitted from the vehicle power management system VPM6 compared to the vehicle power management system VPM5. Details of the collaborative operations and data transmission among the control circuit 1, the second switch circuit SW2, the charge/discharge circuit 2 and the vehicle load device L are as those given in the description associated with the vehicle power management system VPM5 of the fifth embodiment above.

Figure 7:
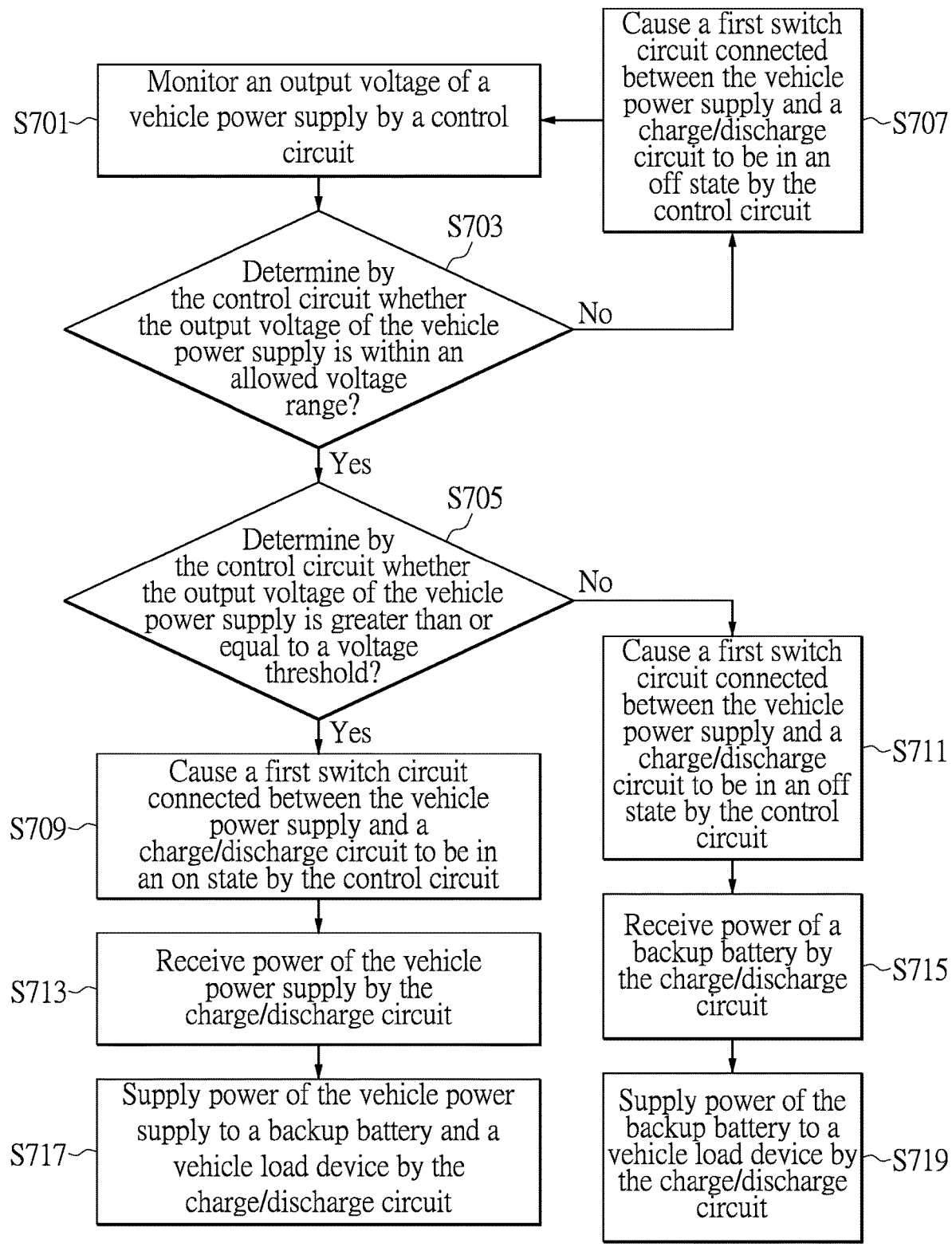
FIG. 7 is a flowchart of an operating method of a vehicle power management system according to the first embodiment of the present invention.

FIG. 7 shows a flowchart of an operating method of a vehicle power management system according to the first embodiment of the present invention. The operating method of the vehicle power management system in FIG. 7 may be performed by, for example but not limited to, either of the vehicle power management systems VPM1 and VPM2 in FIG. 1 and FIG. 2.

As shown in FIG. 7, regarding step S701, the output voltage of the vehicle power supply P is monitored by the control circuit 1. Regarding step S703, it is determined by the control circuit 1 whether the output voltage of the vehicle power supply P is within an allowed voltage range. Step S705 follows when the output voltage of the vehicle power supply P is within the allowed voltage range. Step S707 follows when the output voltage of the vehicle power supply P is not within the allowed voltage range.

In step S705, it is determined by the control circuit 1 whether the output voltage of the vehicle power supply P is greater than or equal to a voltage threshold. In step S707, the first switch circuit SW1 connected between the vehicle power supply P and the charge/discharge circuit 2 is caused to be in an off state by the control circuit 1. The method returns to step S701 after step S707.

Step S709 follows when the output voltage of the vehicle power supply P is greater than or equal to the voltage threshold. Step S711 follows when the output voltage of the vehicle power supply P is smaller than the voltage threshold. Specifically, when the control circuit 1 learns that the monitored output voltage of the vehicle power supply P is greater than or equal to the threshold voltage, the control circuit 1 determines that the vehicle engine is started. Conversely, when the control circuit 1 learns that the monitored output voltage of the vehicle power supply P is smaller than the threshold voltage, the control circuit 1 determines that the vehicle engine is not started.

Regarding step S709, the first switch circuit SW1 connected between the vehicle power supply P and the charge/discharge circuit 2 is caused to be in an on state by the control circuit 1. Regarding step S711, the first switch circuit SW1 connected between the vehicle power supply P and the charge/discharge circuit 2 is caused to be in an off state by the control circuit 1. Specifically, when the control circuit 1 determines that the vehicle engine is started, the control circuit 1 causes the first switch circuit SW1 to be in an on state. Conversely, when the control circuit 1 determines that the vehicle engine is not started, the control circuit 1 causes the first switch circuit SW1 to be in an off state.

Step S713 follows after step S709. Regarding step S713, power supplied by the vehicle power supply P is received by the charge/discharge circuit 2.

Step S715 follows after step S711. Regarding step S715, power supplied by the backup battery 3 is received by the charge/discharge circuit 2.

Step S717 follows after step S713. Regarding step S717, power of the vehicle power supply P is supplied to the backup battery 3 and the vehicle load device L by the charge/discharge circuit 2.

Step S719 follows after step S715. Regarding step S719, power of the backup battery 3 is supplied to the vehicle load device L by the charge/discharge circuit 2.

Figure 8A:
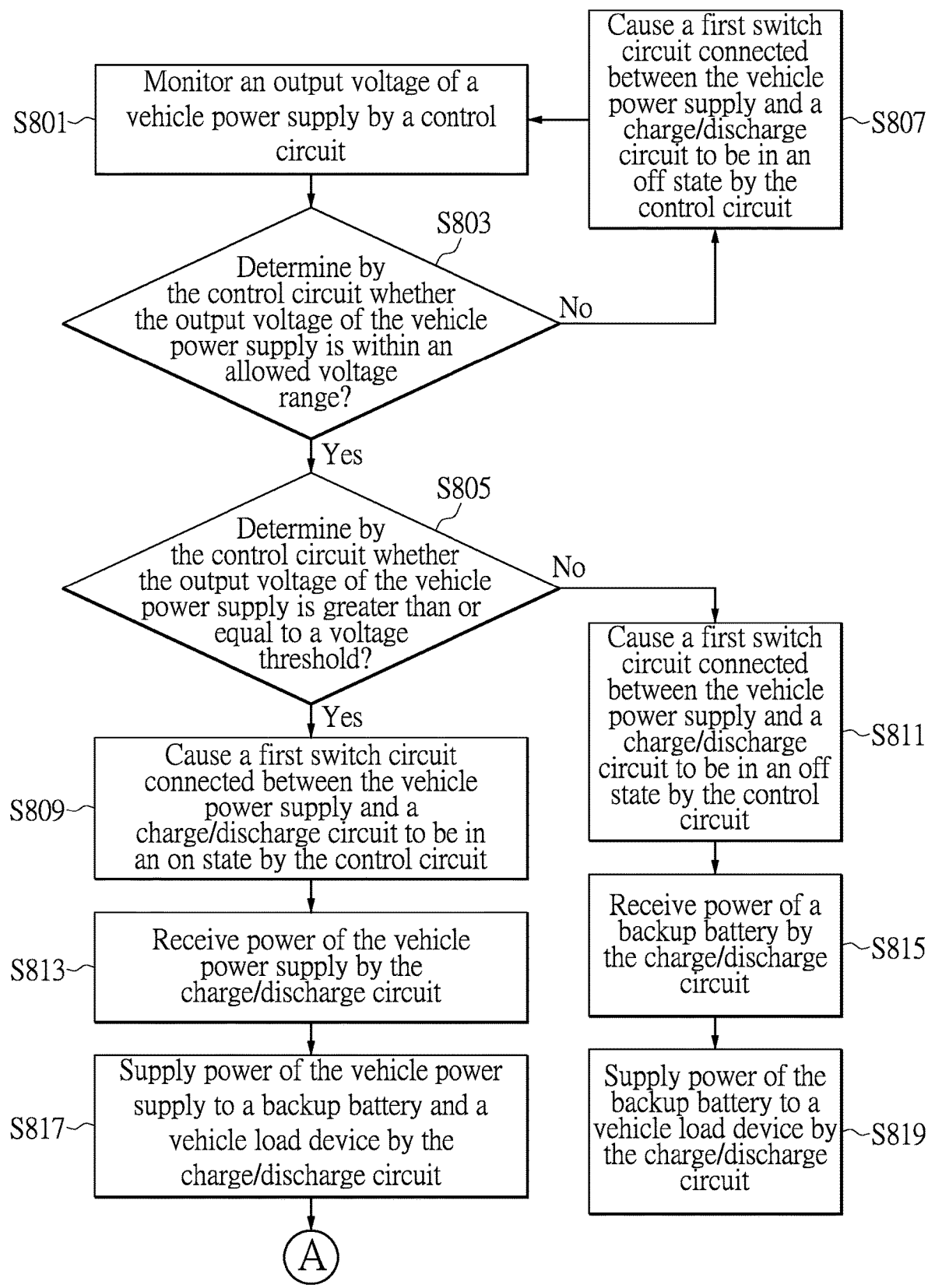
FIG. 8A and FIG. 8B are flowcharts of an operating method of a vehicle power management system according to the second embodiment of the present invention.
Figure 8B:
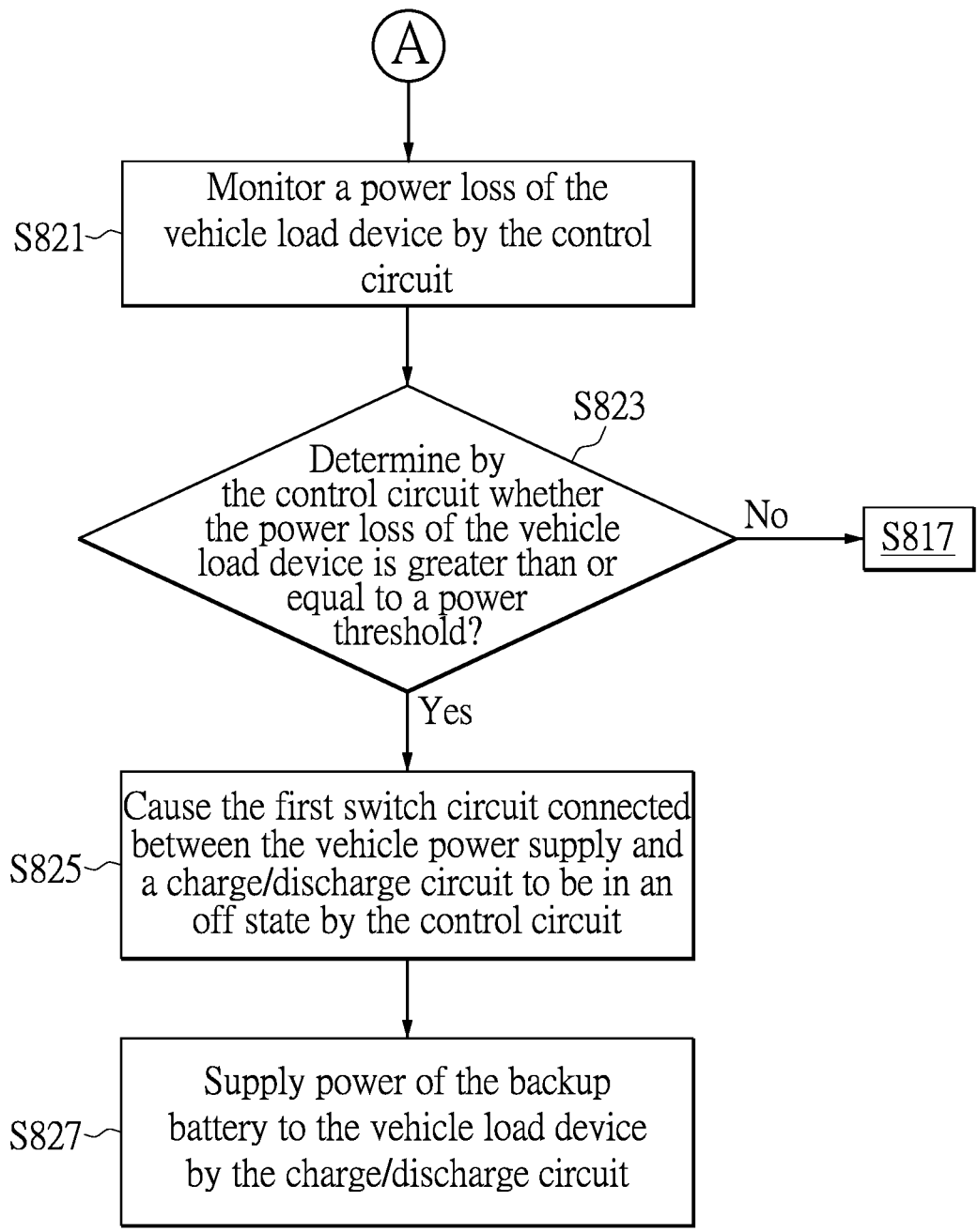

FIG. 8A and FIG. 8B show flowcharts of an operating method of a vehicle power management system according to the second embodiment of the present invention. The operating method of a vehicle power management system in FIG. 8A and FIG. 8B may be performed by, for example but not limited to, either of the vehicle power management systems VPM3 and VPM4 in FIG. 3 and FIG. 4.

The operating method of the vehicle power management system in FIG. 8A and FIG. 8B includes step S801 to step S825, wherein the operating method of a vehicle power management system in FIG. 8A and FIG. 8B differs from the operating method of a vehicle power management system in FIG. 7 in respect of step S821 to step S827. Step S801 to step S819 of FIG. 8A are respectively the same as step S701 to step S719 of FIG. 7.

As shown in FIG. 8B, regarding step S821, a power loss of the vehicle load device L is monitored by the control circuit 1. Regarding step S823, it is determined by the control circuit 1 whether the power loss of the vehicle load device L is greater than or equal to a power threshold.

Step S825 follows when the power loss of the vehicle load device L is greater than or equal to the power threshold. The method returns to step S817 when the power loss of the vehicle load device L is smaller than the power threshold.

Regarding step S825, the first switch circuit SW1 connected between the vehicle power supply P and the charge/discharge circuit 2 is caused to be in an off state by the control circuit 1. Regarding step S827, power of the backup battery 3 is supplied to the vehicle load device L by the charge/discharge circuit 2.

Figure 9A:
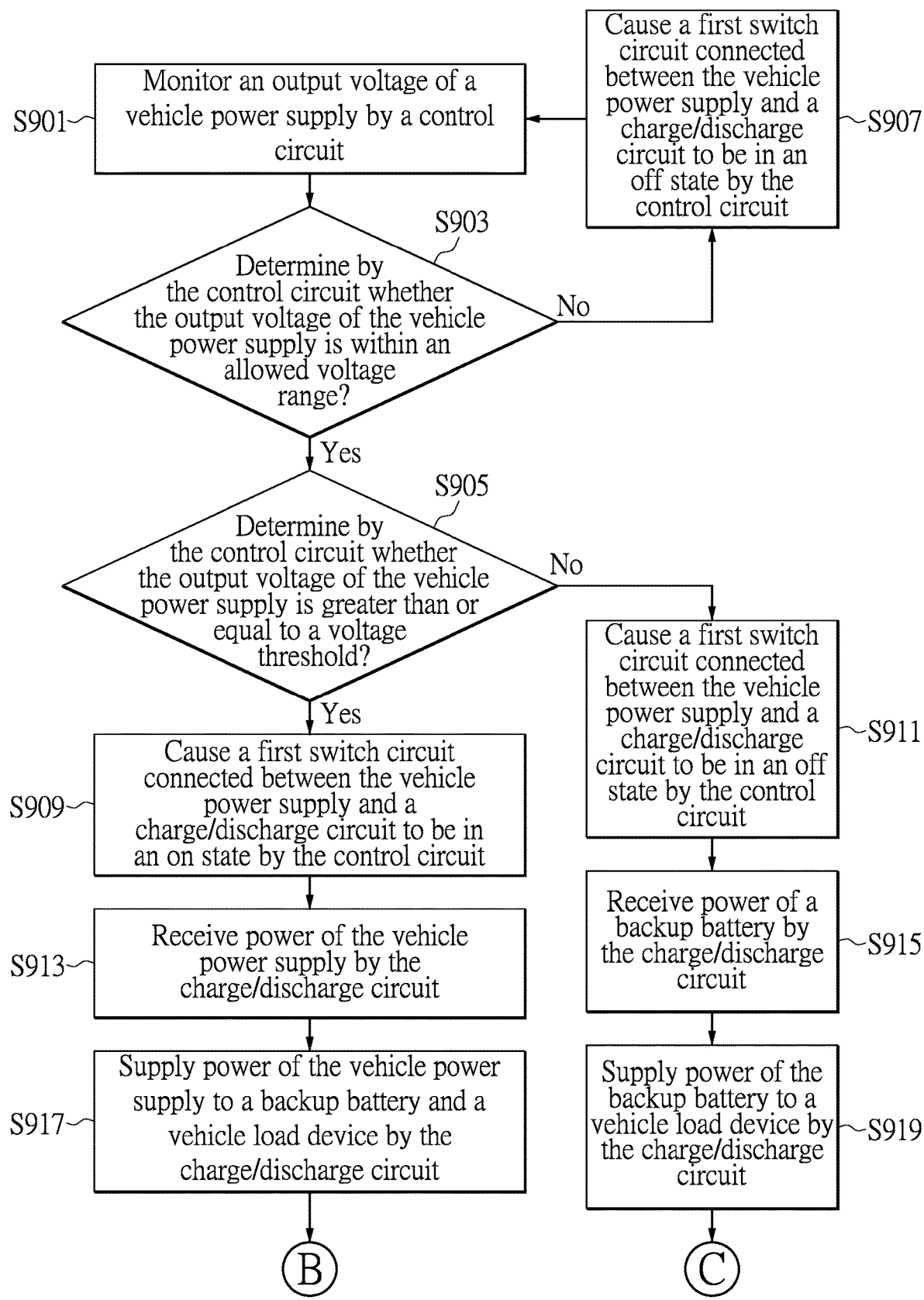
FIG. 9A, FIG. 9B and FIG. 9C are flowcharts of an operating method of a vehicle power management system according to the third embodiment of the present invention.
Figure 9B:
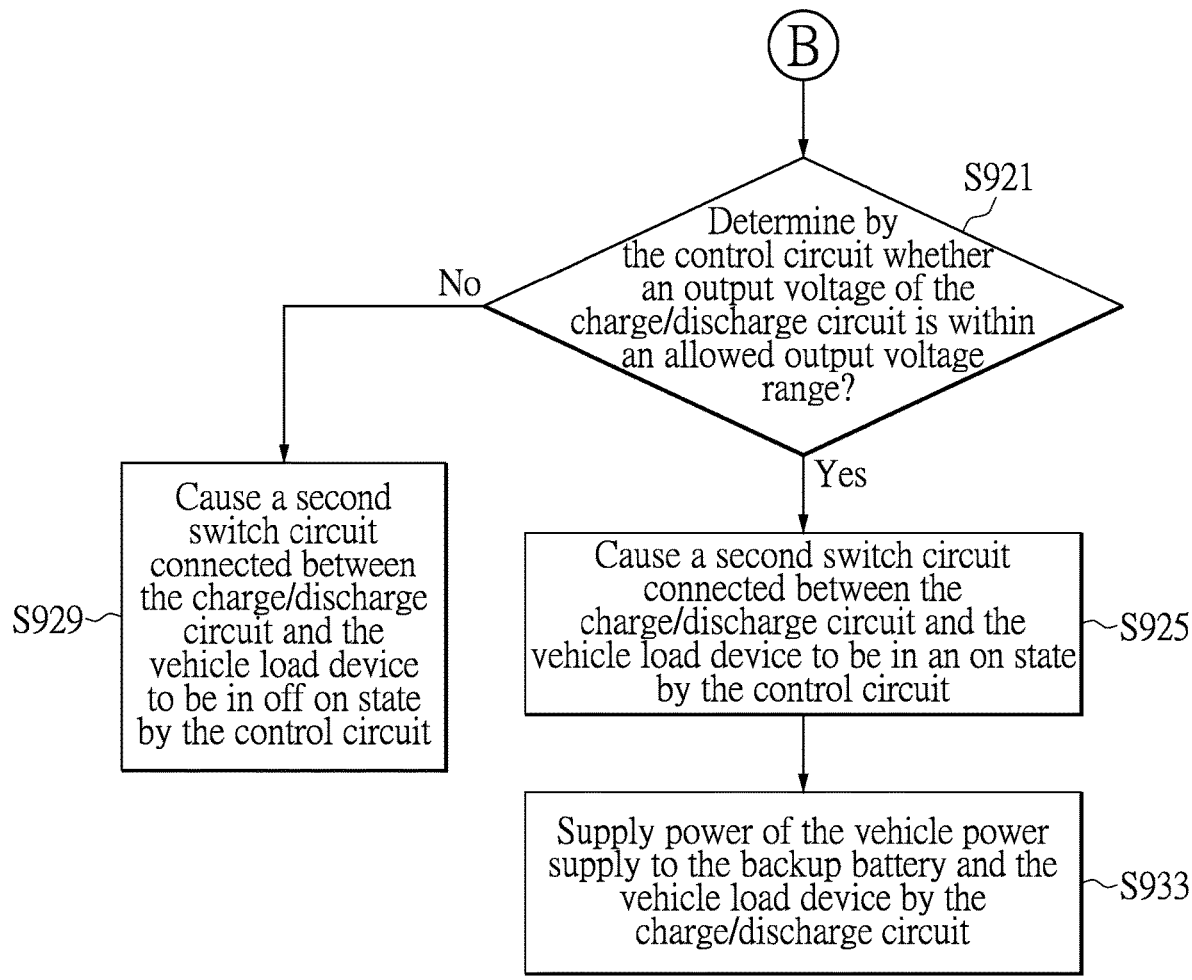
Figure 9C:
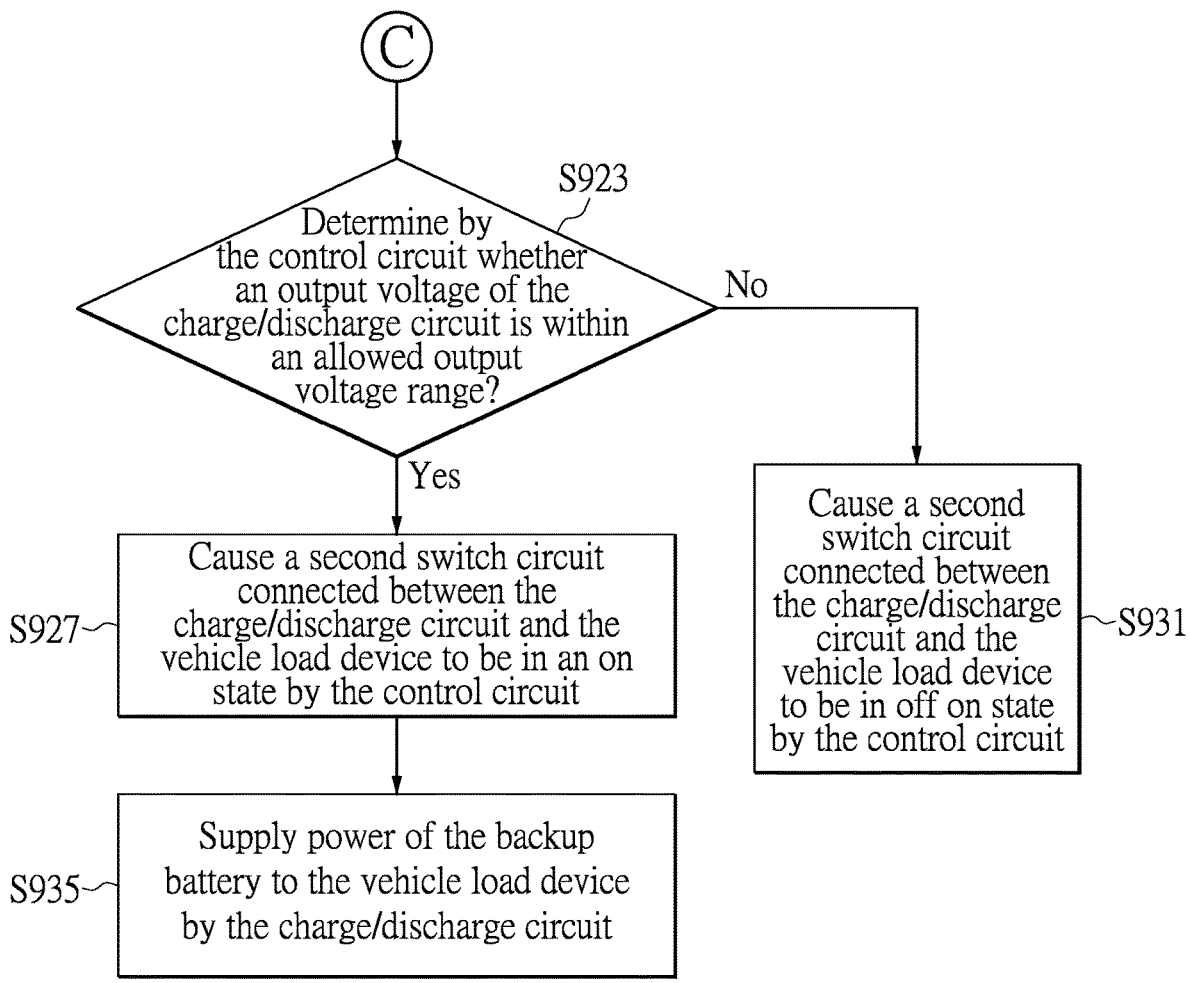

FIG. 9A, FIG. 9B and FIG. 9C show flowcharts of an operating method of a vehicle power management system according to the third embodiment of the present invention. The operating method of a vehicle power management system in FIG. 9A, FIG. 9B and FIG. 9C may be performed by, for example but not limited to, either of the vehicle power management systems VPM5 and VPM6 in FIG. 5 and FIG. 6.

The operating method of the vehicle power management system in 9A, FIG. 9B and FIG. 9C includes step S901 to step S935, wherein the operating method of a vehicle power management system in 9A, FIG. 9B and FIG. 9C differs from the operating method of a vehicle power management system in FIG. 7 in respect of step S921 to step S935.

Step S921 follows after step S917. Step S923 follows after step S919. As shown in FIG. 9B and FIG. 9C, regarding step S921 and step S923, it is determined by the control circuit 1 whether the output voltage of the charge/discharge circuit 2 is within an allowed output voltage range.

Step S925 and step S927 follow when the output voltage of the charge/discharge circuit 2 is within the allowed output voltage range. Step S929 and step S931 follow when the output voltage of the charge/discharge circuit 2 is not within the allowed output voltage range.

Regarding step S925 and step S927, the second switch circuit SW2 connected between the charge/discharge circuit 2 and the vehicle load device L is caused to be in an on state by the control circuit 1. Regarding step S929 and step S931, the second switch circuit SW2 connected between the charge/discharge circuit 2 and the vehicle load device L is caused to be in an off state by the control circuit 1.

As shown in FIG. 9B and FIG. 9C, step S933 follows after step S925. Regarding step S933, power of the vehicle power supply P is supplied to the backup battery 3 and the vehicle load device L by the charge/discharge circuit 2.

Step S935 follows after step S927. Regarding step S935, power of the backup battery 3 is supplied to the vehicle load device L by the charge/discharge circuit 2.

BENEFITS OF THE EMBODIMENTS

One beneficial effect of the present invention is that, the vehicle power management system and the operating method thereof provided by the present invention allow a driver to continue using the vehicle load device mounted in a vehicle when the vehicle engine is turned off. In addition, when the vehicle engine is turned off, the power needed for operating the vehicle load device is completely supplied by the backup battery and the vehicle load device does not at all use power of the vehicle power supply, thus preventing depletion of the power of the vehicle power supply and hence an engine re-start failure caused thereby.

The disclosure above is merely preferred feasible embodiments of the present invention and is not to be construed as limitations to the scope of claims of the present invention. It should be noted that all equivalent technical variations made to the description and the drawings of the present invention are to be encompassed within the scope of claims of the present invention.

What is claimed is:

1. A vehicle power management system, adapted for a vehicle load device and a vehicle power supply, the vehicle power management system comprising:
   a control circuit, electrically connected to the vehicle power supply and the vehicle load device, the control circuit monitoring an output voltage of the vehicle power supply and determining according to the output voltage whether a vehicle engine is started;
   a charge/discharge circuit, electrically connected to the control circuit and the vehicle load device; and
   a backup battery, electrically connected to the charge/discharge circuit;
   wherein, when the vehicle engine is started, the charge/discharge circuit supplies power of the vehicle power supply to the backup battery and the vehicle load device;
   wherein, when the vehicle engine is not started, the charge/discharge circuit supplies power of the backup battery to the vehicle load device;
   wherein, when the vehicle engine is started and the control circuit monitors that a power loss of the vehicle load device is greater than or equal to a power threshold, the charge/discharge circuit supplies the power of the backup battery to the vehicle load device;
   wherein, when the vehicle engine is started and the control circuit monitors that the power loss of the vehicle load device is smaller than the power threshold, the charge/discharge circuit supplies the power of the vehicle power supply to the backup battery and the vehicle load device.

2. The vehicle power management system according to claim 1, further comprising:
   a first switch circuit, electrically connected to the control circuit, the charge/discharge circuit and the vehicle power supply;
   wherein, the control circuit causes the first switch circuit to be in an on state when the vehicle engine is started, and causes the first switch circuit to be in an off state when the vehicle engine is not started.

3. The vehicle power management system according to claim 2, wherein the control circuit is set with an allowed input voltage range and a voltage threshold, and the voltage threshold is within the allowed input voltage range; when the output voltage of the vehicle power supply is within the allowed input voltage range and is greater than or equal to the voltage threshold, the control circuit causes the first switch circuit to be in the on state; when the output voltage of the vehicle power supply is not within the allowed input voltage range or is smaller than the voltage threshold, the control circuit causes the first switch circuit to be in the off state.

4. The vehicle power management system according to claim 2, further comprising:
   a second switch circuit, electrically connected to the charge/discharge circuit, the control circuit and the vehicle load device;
   wherein, the control circuit is further set with an allowed output voltage range; the control circuit causes the second switch circuit to be in an on state when an output voltage of the charge/discharge circuit is within the allowed output voltage range, and causes the second switch circuit to be in an off state when the output voltage of the charge/discharge circuit is not within the allowed output voltage range.

5. An operating method of a vehicle power management system, the operating method comprising:
   monitoring an output voltage of a vehicle power supply by a control circuit;
   determining according to the output voltage by the control circuit whether a vehicle engine is started;
   supplying power of the vehicle power supply to a backup battery and a vehicle load device by a charge/discharge circuit when the vehicle engine is started;
   supplying power of the backup battery to the vehicle load device by the charge/discharge circuit when the vehicle engine is not started;
   supplying the power of the backup battery to the vehicle load device by the charge/discharge circuit when the vehicle engine is started and the control circuit monitors that a power loss of the vehicle load device is greater than or equal to a power threshold; and
   supplying the power of the vehicle power supply to the backup battery and the vehicle load device by the charge/discharge circuit when the vehicle engine is started and the control circuit monitors that the power loss of the vehicle load device is smaller than the power threshold.

6. The operating method of the vehicle power management system according to claim 5, further comprising:
   before supplying the power of the vehicle power supply to the backup battery and the vehicle load device by the charge/discharge circuit, causing a first switch circuit connected between the vehicle power supply and the charge/discharge circuit to be in an on state by the control circuit.

7. The operating method of the vehicle power management system according to claim 5, further comprising:
   before supplying the power of the backup battery to the vehicle load device by the charge/discharge circuit, causing a first switch circuit connected between the vehicle power supply and the charge/discharge circuit to be in an off state by the control circuit.

8. The operating method of the vehicle power management system according to claim 5, further comprising:
- determining by the control circuit whether the output voltage of the vehicle power supply is within an allowed voltage range;
- determining by the control circuit whether the output voltage of the vehicle power supply is greater than or equal to a voltage threshold when the output voltage of the vehicle power supply is within the allowed voltage range;
- causing a first switch circuit connected between the vehicle power supply and the charge/discharge circuit to be in an on state by the control circuit when the output voltage of the vehicle power supply is greater than or equal to the voltage threshold; and
- causing the first switch circuit to be in an off state by the control circuit when the output voltage of the vehicle power supply is not within the allowed voltage range or is smaller than the voltage threshold.

9. The operating method of the vehicle power management system according to claim 8, further comprising:
- determining by the control circuit whether an output voltage of the charge/discharge circuit is within an allowed output voltage range;
- when the output voltage of the charge/discharge circuit is within the allowed output voltage range, causing a second switch circuit connected between the charge/discharge circuit and the vehicle load device to be in an on state by the control circuit; and
- when the output voltage of the charge/discharge circuit is not within the allowed voltage range, causing the second switch circuit to be in an off state by the control circuit.

* * * * *